US009462558B2

(12) United States Patent
Su et al.

(10) Patent No.: US 9,462,558 B2
(45) Date of Patent: *Oct. 4, 2016

(54) MANAGING POWER CONSUMPTION OF TRANSMISSION CIRCUITRY IN A WIRELESS COMMUNICATION DEVICE

(71) Applicant: Apple Inc., Cupertino, CA (US)

(72) Inventors: Li Su, San Jose, CA (US); Ming Hu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,850

(22) Filed: Jan. 11, 2016

(65) Prior Publication Data

US 2016/0212713 A1 Jul. 21, 2016

Related U.S. Application Data

(63) Continuation of application No. 13/936,889, filed on Jul. 8, 2013, now Pat. No. 9,237,519.

(60) Provisional application No. 61/838,305, filed on Jun. 23, 2013.

(51) Int. Cl.
*G08C 17/00* (2006.01)
*H04W 52/22* (2009.01)

(52) U.S. Cl.
CPC ................... *H04W 52/225* (2013.01)

(58) Field of Classification Search
CPC ......... H04W 52/225; H04W 52/0212; H04W 52/0235; H04W 52/228; H04W 40/08
USPC ........................................................ 370/311
See application file for complete search history.

(56) References Cited

U.S. PATENT DOCUMENTS

| 9,237,519 B2* | 1/2016 | Su ..................... H04W 52/0212 |
| 2005/0190855 A1 | 9/2005 | Jin et al. |
| 2011/0002405 A1 | 1/2011 | Raveendran |
| 2012/0071185 A1 | 3/2012 | Dayal et al. |
| 2012/0113918 A1 | 5/2012 | Freda et al. |
| 2012/0275365 A1 | 11/2012 | Anderson et al. |
| 2013/0039173 A1 | 2/2013 | Ehsan et al. |
| 2013/0107780 A1 | 5/2013 | Choi et al. |

FOREIGN PATENT DOCUMENTS

WO 2012093349 7/2012

* cited by examiner

*Primary Examiner* — Andrew Chriss
*Assistant Examiner* — Ellen Kirillova
(74) *Attorney, Agent, or Firm* — Downey Brand LLP

(57) ABSTRACT

Methods, apparatuses and computer readable media are described that manage transmit power levels for a wireless device connected to a network access system of a wireless network. Processing circuitry in the wireless device obtains a target average transmit power level. Based on estimates of an actual average transmit power level for a sliding window of a past time period and the target average transmit power level, the processing circuitry determines a target transmit power level, a duty cycle percentage, and a transmit pattern of transmit on frames and transmit off frames for a future time period. The processing circuitry sends to the access network system signaling messages indicating non-zero valued buffer status reports for the transmit on frames and zero valued buffer status reports for the transmit off frames. Non-zero values correspond to actual amounts of pending uplink data, while zero values are sent irrespective of actual uplink buffer status.

20 Claims, 11 Drawing Sheets

MANAGING POWER CONSUMPTION OF TRANSMISSION CIRCUITRY IN A WIRELESS COMMUNICATION DEVICE

CROSS-REFERENCE TO RELATED APPLICATIONS

This application is a continuation of U.S. application Ser. No. 13/936,889, filed Jul. 8, 2013, which claims the benefit of U.S. Provisional Patent Application No. 61/838,305, filed Jun. 23, 2013, both of which are incorporated by reference herein in their entireties.

TECHNICAL FIELD

The described embodiments generally relate to methods and apparatuses for managing power consumption by components of a wireless communication device. More particularly, the present embodiments describe determining a pattern of signaling messages to enable and disable transmission circuitry in a wireless communication device to realize a target average transmit power level.

BACKGROUND

Wireless communication devices continue to evolve to provide users with higher data throughput based on newer generation wireless communication protocols using various radio access technologies, and to provide users with increased functionality integrating various features in a multi-capable device. A wireless communication device can include support for a Third Generation Partnership Project (3GPP) Long Term Evolution (LTE) wireless communication protocol, e.g. LTE Releases 8 and 9, current LTE-Advanced (also referred to as LTE-A) Releases 10 and 11, and future LTE-Advanced (also referred to as LTE-B) Releases 12 and beyond. High data throughput and advanced functionality (e.g., high density display screens) can place greater demands on limited battery resources available in the wireless communication device. Power consumption of the wireless communication device can be monitored and regulated to ensure an extended battery life under various operating conditions. Transmission circuitry in wireless communication devices can consume significant amounts of power, particularly when transmitting at high transmit power levels to achieve high data rates and/or to overcome high levels of interference and/or noise that can impact the performance of signal decoding at a receiving wireless access network system, e.g., a base station or an eNodeB of an LTE wireless network.

Transmit power levels for a wireless communication device can be controlled at least in part by signaling messages received from a wireless access network system to which the wireless communication device is connected. The wireless access network system can determine uplink transmit power control commands to ensure that signals received at the wireless access network system can be decoded properly and also to minimize interference of transmissions by the wireless communication device into other wireless communication devices in the same cell or in neighbor cells. The transmit power levels required for uplink transmissions can depend on a target data rate and on radio frequency channel conditions at the wireless access network system to which the wireless communication device communicates. When operating in a shared bandwidth wireless system, e.g., an LTE wireless access network, the wireless communication device can be allocated radio frequency resources during which to transmit in the uplink direction. The wireless communication device can request resource allocations by communicating various signaling messages that can provide information about uplink transmission requirements to the wireless access network, e.g., buffer status reports that can indicate amounts of data pending transmission in the uplink direction. Transmitting at lower data rates, e.g., by requesting fewer radio resources, can provide only limited transmit power savings, as the wireless access network can choose a radio resource allocation for the wireless communication device that requires continuous (or nearly continuous) transmission by the wireless communication device at a lower but steady data rate. Thus, transmit power control management for transmission circuitry in wireless communication devices can be improved upon.

SUMMARY OF THE DESCRIBED EMBODIMENTS

Broadly speaking, the described embodiments generally relate to methods and apparatuses for managing power consumption by components of a wireless communication device. More particularly, the present embodiments describe determining a pattern of signaling messages to enable and disable transmission circuitry in a wireless communication device to realize a target average transmit power level.

In an embodiment, a method to adapt transmission circuitry to realize a target average transmit power level in a wireless communication device connected to a wireless network is described. The method comprises one or more of the following steps. Processing circuitry in the wireless communication device obtains a target average transmit power level. The processing circuitry estimates an actual average transmit power level for a recent past time period. The processing circuitry determines a target transmit power level for a future time period. The processing circuitry determines a duty cycle percentage for the future time period. The processing circuitry determines a transmit pattern of transmit on frames and transmit off frames for the future time period. Wireless circuitry in the wireless communication device sends to an access network system of the wireless network a first set of one or more signaling messages indicating a non-zero amount of data associated with the transmit on frames and a second set of one or more signaling messages indicating a zero amount of data associated with the transmit off frames.

In another embodiment, a wireless communication device is described. The wireless communication device comprises one or more processors configured to manage transmit power levels of the wireless communication device connected to an access network system of a wireless network; and wireless circuitry configured to transmit signals to and receive signals from the access network system of the wireless network according to a wireless communication protocol. The one or more processors of the wireless communication device are further configured to execute one or more of the following. The one or more processors obtain a target average transmit power level. The one or more processors estimate an actual average transmit power level for a recent past time period. The one or more processors determine a target transmit power level for a future time period, determine a duty cycle percentage for the future time period, and determine a transmit pattern of transmit on frames and transmit off frames for the future time period. The one or more processors further send to the access network system of the wireless network a first set of one or more signaling messages indicating a non-zero amount of data associated with the transmit on frames and a second set of one or more signaling messages indicating a zero amount of data associated with the transmit off frames.

In another embodiment, a computer program product encoded as computer program code in a non-transitory computer readable medium for adjusting transmit levels of wireless circuitry in a wireless communication device connected to a wireless network is described. The computer program product includes the following computer program code. The computer program product includes computer program code for obtaining a target average transmit power level. The computer program product includes computer program code for estimating an actual average transmit power level for a recent past time period. The computer program product includes computer program code for determining a target transmit power level for a future time period. The computer program product includes computer program code for determining a duty cycle percentage for the future time period. The computer program product includes computer program code for determining a transmit pattern of transmit on frames and transmit off frames for the future time period. The computer program product includes computer program code for sending to an access network system of the wireless network a first set of one or more signaling messages indicating a non-zero amount of data associated with the transmit on frames and a second set of one or more signaling messages indicating a zero amount of data associated with the transmit off frames.

The above summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
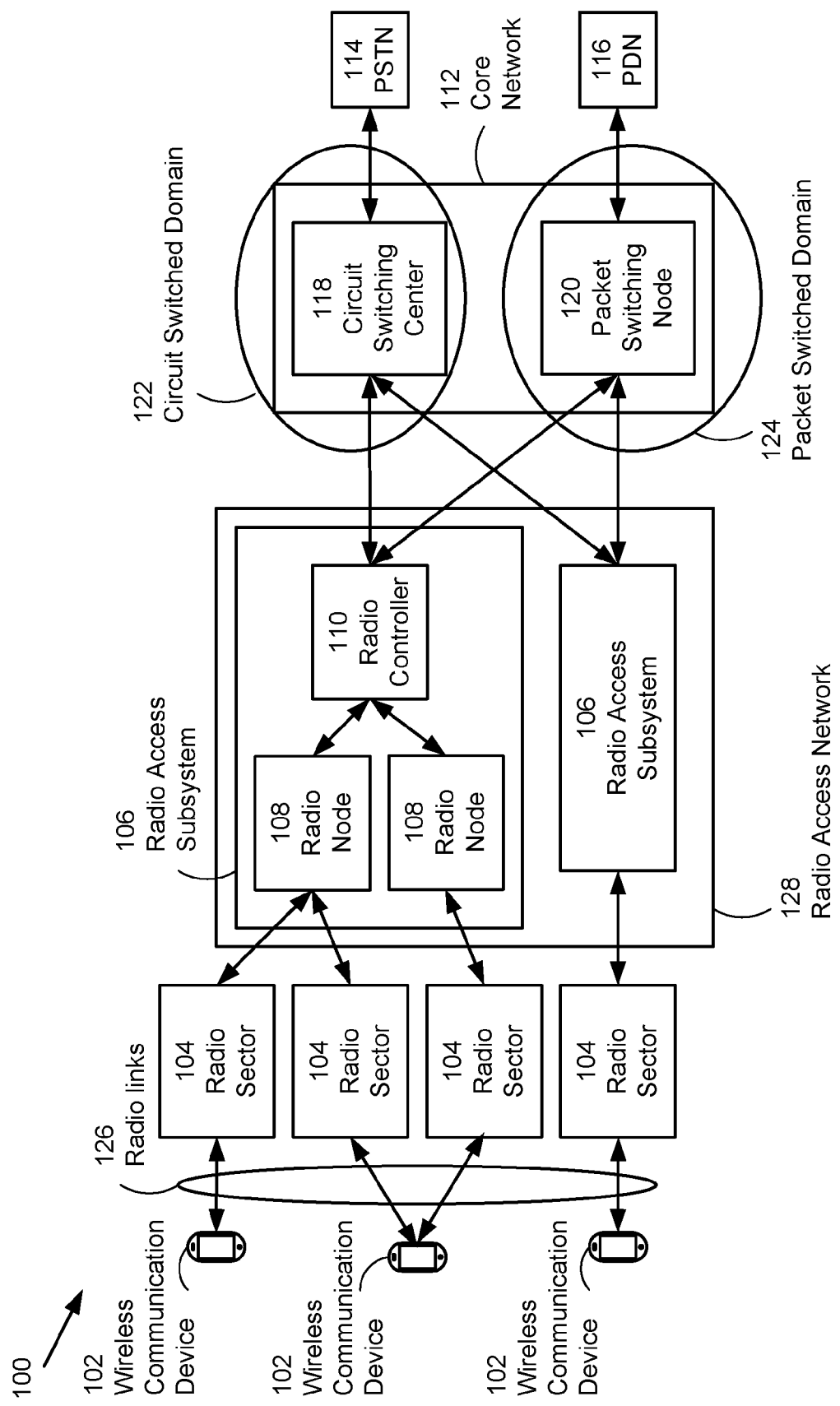
FIG. 1 illustrates components of a generic wireless communication network in accordance with some embodiments.

Wireless networks continue to evolve as network operators deploy equipment for new wireless communication technologies based on ongoing standardization efforts. Wireless communication devices can provide capabilities to communicate with wireless networks based on newer wireless network technologies that offer advanced capabilities, e.g., higher data rates and new services. High data rate transmission, however, can also require higher power consumption of limited battery resources available in wireless communication devices. Similarly data transmission by the wireless communication device in the uplink direction under challenging radio frequency channel conditions, e.g., attenuation due to long distances between the wireless communication device and access network systems of a wireless network and/or high levels of interference and noise at receivers of the access network systems, can require higher transmit power levels and attendant higher power consumption by the wireless communication device. As the wireless communication device can be required to function properly under a broad range of operating conditions, a power management system in the wireless communication device can monitor parameters, e.g., component temperatures, and provide information for power consumption control. Processing circuitry in the wireless communication device can determine transmit power levels, including for example transmit on and transmit off time periods, to assist in managing transmit power consumption by the wireless communication device.

In a Long Term Evolution (LTE) wireless network system, uplink transmit power control for the wireless communication device can be managed, at least in part, by access network systems, e.g., a base station and/or an evolved Node B (eNodeB), which can allocate radio frequency resources to the wireless communication device in response to information provided in signaling messages communicated by the wireless communication device (and also using signaling messages provided by other parallel wireless communication devices connected within the same cell or within a set of cells emanating from the eNodeB or a set of eNodeBs to which the wireless communication device is connected). The eNodeB can influence the transmit power levels of the wireless communication device in order to ensure uplink transmissions can be decoded properly at a receiver of the eNodeB and also to minimize interference of transmissions of the wireless communication device into other wireless communication devices in the same cell (and/or in neighboring cells). Transmit power control and/or radio resource scheduling algorithms used by the eNodeB, however, can be not optimized for minimal power consumption by the wireless communication device. The wireless communication device can influence the radio resource allocation provided by the eNodeB by communicating an indication of an amount of data pending uplink transfer in transmit buffers of the wireless communication device. When provided a target transmit power level (or a target average transmit power level over a period of time), the wireless communication device can measure (or estimate) an average transmit power level for a recent past time period and can determine a target average (and/or instantaneous) transmit power level for a future time period based on the measured past average transmit power level and the target transmit power level. In some embodiments, wireless processing circuitry in the wireless communication device obtains a target average transmit power level from an applications processor or other control processor of the wireless communication device. In some embodiments, the wireless communication device determines a duty cycle percentage of "transmit on" and "transmit off" transmissions (e.g., transmit frames) for a future time period based on the obtained target average transmit power level and the measured actual average transmit power level for a recent past time period. In some embodiments, the wireless communication device determines the duty cycle percentage to achieve (or approximate) the target average transmit power level during the future time period. In some embodiments, the wireless communication device determines a pattern of "transmit on" and "transmit off" time periods (e.g., frames) that achieve (or approximate) the duty cycle percentage during the future time period. In an embodiment, the wireless communication device can determine the pattern of "transmit on" and "transmit off" time periods based on an estimate of radio frequency channel conditions during the future time period. In some embodiments, the wireless communication device can align "transmit on" time periods with "good" radio frequency channel conditions and "transmit off" time periods with "poor" radio frequency channel conditions. In some embodiments, "good" radio frequency channel conditions can be associated with a high level of signal relative to noise and/or interference, while "poor" radio frequency channel conditions can be associated with a low level of signal relative to noise and/or interference. In an embodiment, the wireless communication device can seek to turn "off" transmission circuitry during time periods estimated to have "poor" radio frequency channel conditions to conserve transmit power for use during time periods of "good" radio frequency channel conditions. In some embodiments, the wireless communication device communicates a first set of one or more signaling messages requesting a non-zero amount of uplink radio resources to use during the "transmit on" time periods and a second set of one or signaling messages requesting a zero amount of uplink radio resources for the "transmit off" time periods. The wireless communication device can indicate an actual amount of data pending uplink transfer in the signaling messages for the "transmit on" time periods. In some embodiments, the wireless communication device can indicate an amount less than the actual amount of data pending uplink transfer (e.g., to achieve a lower average data rate transfer). In some embodiments, the wireless communication device can indicate a zero amount of data for uplink transfer to the eNodeB for the "transmit off" time periods, even when uplink transmit buffers are not empty in the wireless communication device. Representative signaling messages include buffer status reports communicated periodically and/or a-periodically by the wireless communication device to the eNodeB of an LTE wireless network to provide an indication of pending uplink data available in the wireless communication device for transfer to the eNodeB of the LTE wireless network.

The wireless communication device can include a closed loop temperature management (CLTM) system that monitors temperatures of one or more components of the wireless communication device. In some embodiments, a control processor (and/or an application processor) provides one or more of the following information elements to wireless processing circuitry in the wireless communication device: (1) actual/estimated operating temperature of one or more components, (2) target operating temperature of one or more components, (3) a target average transmit power level for one or more components, (4) a target average power consumption for one or more components, and (5) an actual average power consumption for one or more components. In some embodiments, the wireless processing circuitry uses at least a portion of the information provided by the control/applications processor to determine an operating point for one or more wireless transmission components, e.g., to determine an average transmit power level, an average transmit power consumption, an operating temperature, or a combination of these for the one or more wireless transmission components (e.g., for uplink transmitters).

FIG. 1 illustrates a representative generic wireless network 100 that can include multiple wireless communication devices 102 connected by radio links 126 to radio sectors 104 provided by a radio access network 128. (Radio sectors 104 can also be referred to as cells in some embodiments.) Each radio sector 104 can represent a geographic area of radio coverage emanating from an associated radio node 108 using a radio frequency channel operating at a selected frequency. Each radio node 108 can generate one or more radio sectors 104 to which the wireless communication device 102 can connect by one or more radio links 126. In some wireless networks 100, the wireless communication device 102 can be connected to more than one radio sector 104 simultaneously. The multiple radio sectors 104 to which the wireless communication device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the wireless communication device 102 to the radio access network 128.

Radio resources that form the radio links 126 in the radio sectors 104 can be shared among multiple wireless communication devices 102 using a number of different multiplexing techniques, including time division, frequency division, code division, space division and combinations thereof. A radio resource control (RRC) signaling connection can be used to communicate between the wireless communication device 102 and the radio controller 110 in the radio access subsystem 106 of the radio access network 128 including requests for and dynamic allocations of radio resources to multiple wireless communication devices 102. Suspension of allocation of radio resources to a wireless communication device 102 can occur without dis-establishing the RRC signaling connection to the wireless communication device 102.

The radio access network 128, which provides radio frequency air link connections to the wireless communication device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit-switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
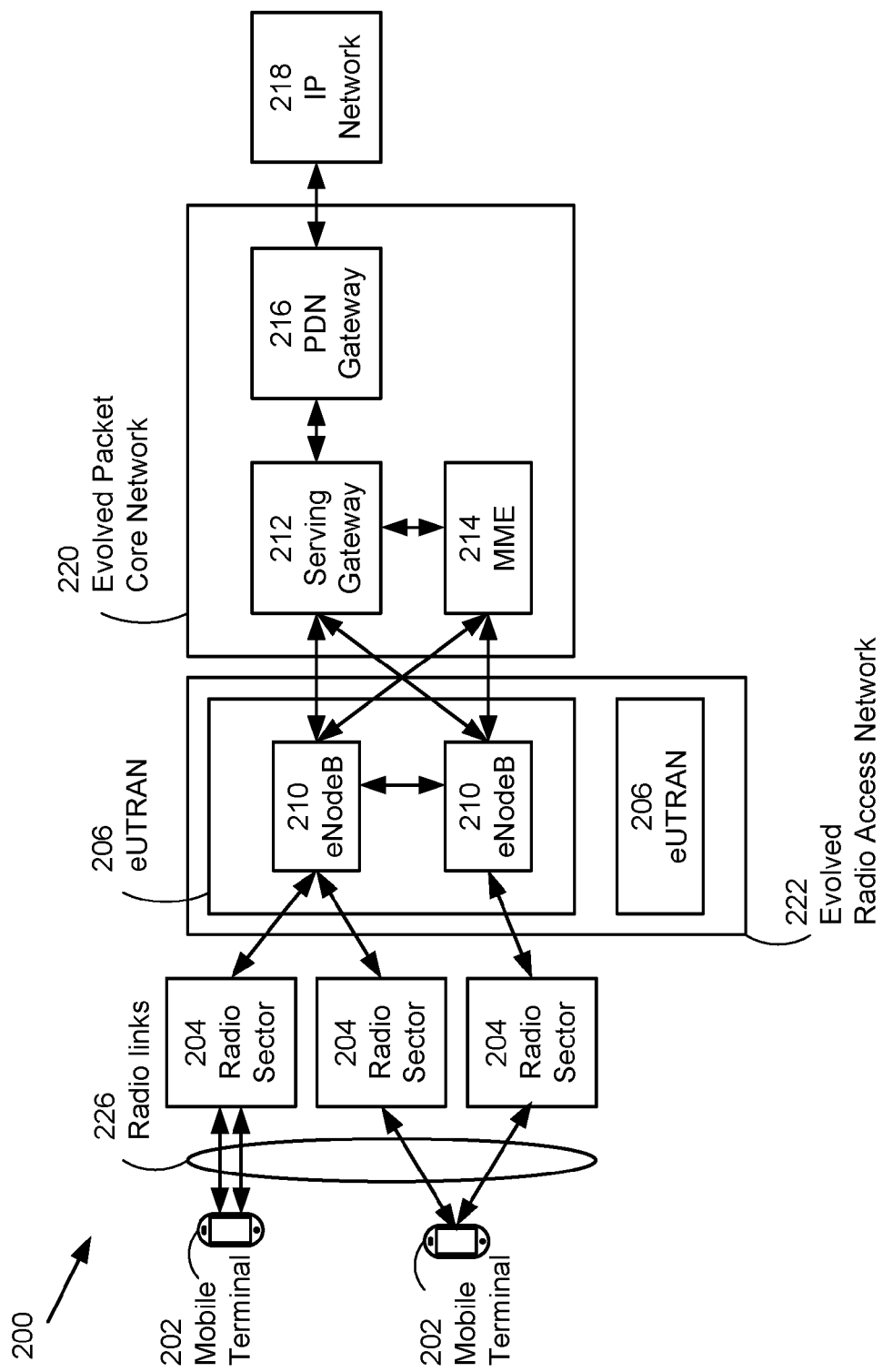
FIG. 2 illustrates components of an LTE (or LTE-Advanced) wireless communication network in accordance with some embodiments.

FIG. 2 illustrates a representative Long Term Evolution (LTE) wireless network 200 architecture designed as a packet switched network exclusively. A mobile terminal 202 can connect to an evolved radio access network 222 through radio links 226 associated with radio sectors 204 that emanate from evolved Node B's (eNodeB) 210. (In some embodiments, radio sectors 204 can be referred to as cells and mobile terminals 202 can be referred to as user equipment (UE) or as mobile wireless communication devices 102.) The eNodeB 210 can include the functions of both transmitting and receiving base stations (such as the radio node 108 in the generic wireless network 100) as well as base station radio controllers (such as the radio controller 110 in the generic wireless network 100). The equivalent core network of the LTE wireless network 200 is an evolved packet core network 220 including serving gateways 212 that interconnect the evolved radio access network 222 to public data network (PDN) gateways 216 that connect to external internet protocol (IP) networks 218. Multiple eNodeB 210 can be grouped together to form an eUTRAN 206. The eNodeB 210 can also be connected to a mobility management entity (MME) 214 that can provide control over connections for the mobile terminal 202.

The eNodeB 210 can control an allocation of radio resources for the radio links 226 to the mobile terminals 202. The eNodeB 210 can receive signaling messages from the mobile terminal 202 (or equivalently from the wireless communication device 102) that provides information by which the eNodeB 210 can schedule the availability of radio resources for the mobile terminal 202 (and for other mobile terminals 202 also communicating through one or more radio sectors 204). The eNodeB 210 can balance requirements for uplink transmission by multiple mobile terminals 202, allocating radio resources to one or more of the multiple mobile terminals 202 based on one or more scheduling criteria, e.g., measured and/or estimated channel conditions, measured and/or estimated SINR levels, quantities of uplink data available for transport from the multiple mobile terminals 202, a past history of radio resource scheduling decisions for the multiple mobile terminals 202, and/or a past history of radio resource requests from the multiple mobile terminals 202. The eNodeB 210 can seek to balance uplink transmission demands from the multiple mobile terminals 202, ensure proper decoding of messages received from the multiple mobile terminals 202, and mitigate negative effects of interference between transmissions of the multiple mobile terminals 202. In some embodiments, a mobile terminal 202 provides information to the eNodeB 210 using signaling messages that contain buffer status reports (BSRs) that can indicate an amount of uplink data pending transmission from the mobile terminal 202 to the eNodeB 210. Buffer status reports can be communicated periodically, e.g., scheduled by the eNodeB 210 (or by other network elements of the LTE wireless network 200), and/or a-periodically, e.g., in response to a request for information by the eNodeB 210 to the mobile terminal 202. The eNodeB 210 can use information in the buffer status reports to influence scheduling of allocations of radio resources to the mobile terminal 202.

Figure 3:
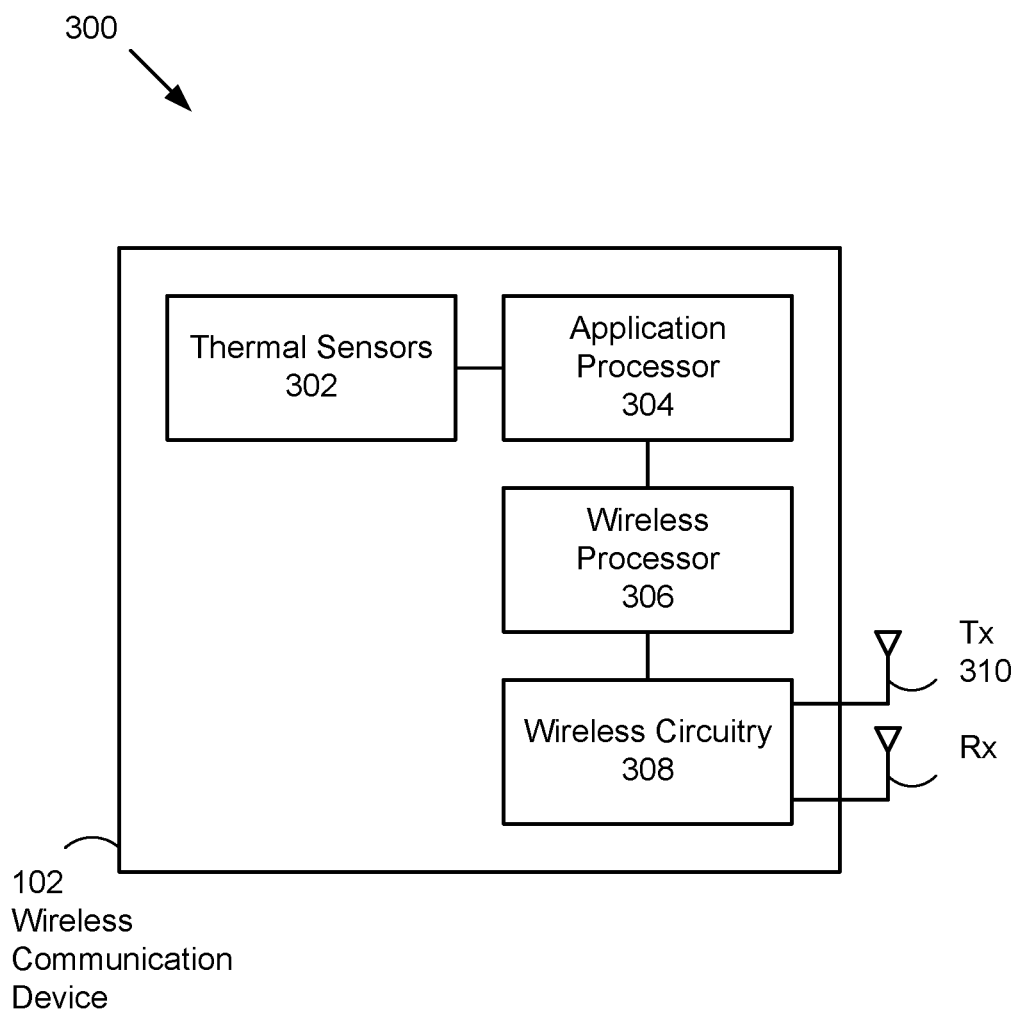
FIG. 3 illustrates components of a wireless communication device in accordance with some embodiments.

FIG. 3 illustrates a set of components 300 that can be contained in a wireless communication device 102 (or equivalently a mobile terminal 202). The wireless communication device 102 can include a set of thermal sensors 302 that can monitor temperature of various components contained in the wireless communication device 102. Many components of the wireless communication device 102 can be required to operate within defined temperature ranges for optimal performance, and in addition a measured temperature of a component can provide information about power consumption for the component, in some circumstances. In a wireless communication device 102 that operates primarily on limited battery resources, a balance between power consumption (which can be minimized to extend battery life) and performance (which can be maximized to offer the user higher throughput and/or processing power) can be regulated, at least in part, by an application processor 304 (or other processing circuitry) contained in the wireless communication device 102. The application processor 304 can use information provided by thermal sensors 302 and optionally additional information provided by a wireless processor 306 to determine target values for operating points (e.g., temperature, power consumption, power level, data throughput, etc.) for one or more components in the wireless communication device 102. In some embodiments, the application processor 304 provides (1) temperature information, (2) target temperature levels, (3) target transmit power levels, (4) a target average transmit power level, (5) a target average transmit power consumption, (6) a power increase indication, (7) a power decrease indication, or (8) a combination of these to the wireless processor 306. In some embodiments, the wireless processor 306 uses information provided by the application processor 304, at least in part, to determine a future transmit power level, a target transmit power level, a target transmit power consumption, a set of transmit power control signals, a transmit on period, a transmit off period, or another set of transmit power controls to apply to wireless circuitry 308 in the wireless communication device 102. In some embodiments, the wireless processor 306 measures and/or estimates power consumption and/or transmit power levels and/or an average transmit power level for one or more wireless transmitters 310 controlled by wireless circuitry 308 in the wireless communication device 102. In an embodiment, the wireless processor 306 sets a transmit power level for wireless circuitry 308 (and one or more associated transmitters 310) for a future time period, e.g., based on measurements and/or estimates for a recent past time period. In an embodiment, the wireless processor 306 determines a target duty cycle for the wireless circuitry 308 and associated transmitters 310 for a future time period. The wireless circuitry 308 can enable or disable transmission by one or more transmitters 310 in the wireless communication device 102. In an embodiment, the wireless processor 306 and/or the wireless circuitry 308 determines a set of "transmit on" time periods and "transmit off" time periods that can achieve and/or approximate a target duty cycle during a future time period. In an embodiment, the wireless processor 306 and/or the wireless circuitry 308 monitors transmit power consumption to achieve the target duty cycle during the future time period. In some embodiments, the "transmit on" time periods and the "transmit off" time periods comprise a number of contiguous frames, e.g., a time period of 20 to 50 milliseconds comprising 2 to 5 contiguous 10 millisecond frames. In an embodiment, the application processor 304 provides temperature and/or power control information to the wireless processor 306 at regular time intervals, e.g., once per 30 seconds. In some embodiments, the wireless processor 306 determines target average transmit power levels and/or a target duty cycle based on measurements over a recent time period on the order of 100 milliseconds. In some embodiments, the wireless processor 306 determines a transmit power level for one or more transmitters 310, a target transmit duty cycle, and a pattern of "transmit on" time periods and "transmit off" time periods to approximate the target transmit duty cycle in order to achieve a target average transmit power level and/or a target average transmit power consumption.

Figure 4:
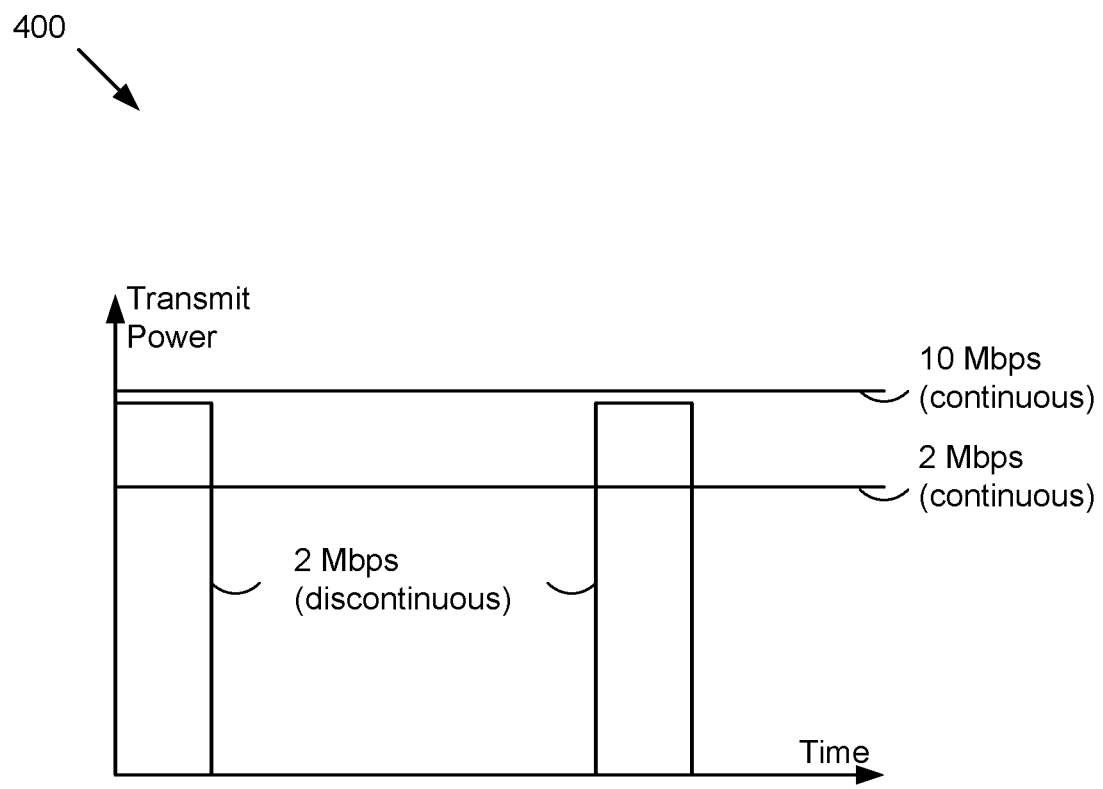
FIG. 4 illustrates transmit power levels for the wireless communication device in accordance with some embodiments.

FIG. 4 illustrates a graph 400 of different transmit power levels by a wireless communication device 102 in accordance with some embodiments. The wireless communication device 102 can transmit at different data rates to a wireless access network system (e.g., an eNodeB 210) depending on different wireless radio frequency channel conditions (e.g., attenuation, noise, interference) and on an amount of data pending in buffers of the wireless communication device 102 for transmission to the eNodeB 210. In general, higher data rate transmissions can consume more transmit power than lower data rate transmissions, e.g., using wider bandwidths and/or higher bit density transmissions (e.g., higher bits per Hz). As illustrated by the graph 400, transmission at a continuous bit rate of 10 Mbps can require higher levels of transmit power than transmission at a continuous bit rate of 2 Mbps. The amount of power savings for transmitting continuously at various bit rates can be less than desired, particularly when considering variations in radio frequency channel conditions. A transmit power level to achieve a relatively low bit rate (on average) under "poor" radio frequency channel conditions, e.g., lower signal-to-interference-and-noise ratio (SINR) due to high levels of signal attenuation and/or additive noise and/or destructive interference, can be nearly as high as a transmit power level to achieve a relatively high bit rate under "good" radio frequency channel conditions, e.g., higher SINR. As illustrated in FIG. 4, a transmit power level required for continuous transmission at 2 Mbps can nearly as high as required for continuous transmission at 10 Mbps (depending on respective radio frequency channel conditions). In some circumstances, less transmit power can be required to transmit at a given data transmission rate (on average) by transmitting at a high data transmission rate for certain periods of time and not transmitting (i.e., transmitting at a "zero" data transmission rate) for other periods of time. As illustrated in FIG. 4, when channel conditions can support transmitting at 10 Mbps in relatively short bursts, an average data rate of 2 Mbps can be achieved using discontinuous transmission. The average transmit power level for discontinuous 2 Mbps transmission can be lower (and in some cases substantially lower) than for continuous 2 Mbps transmission. In some embodiments, the wireless communication device 102 can more efficiently consume power for transmission by transmitting in bursts of "transmit on" time periods with "transmit off" time periods interspersed between the "transmit on" time periods.

In some embodiments, the wireless communication device 102 can request radio resources from the eNodeB 210 by sending one or more signaling messages, e.g., a set of buffer status reports, that includes a non-zero value indicating data pending transmission in the uplink direction. In some embodiments, the wireless communication device 102 can achieve a target average power consumption (or target average transmit power level) by requesting radio resources during "transmit on" time periods and by not requesting radio resources during "transmit off" time periods. In some embodiments, the wireless communication device 102 communicates a non-zero amount of pending data in one or more buffer status reports communicated to the eNodeB 210 during and/or before "transmit on" time periods and communicates a zero amount of pending data in one or more buffers status reports communicated to the eNodeB 210 during and/or before "transmit off" time periods.

Figure 5:
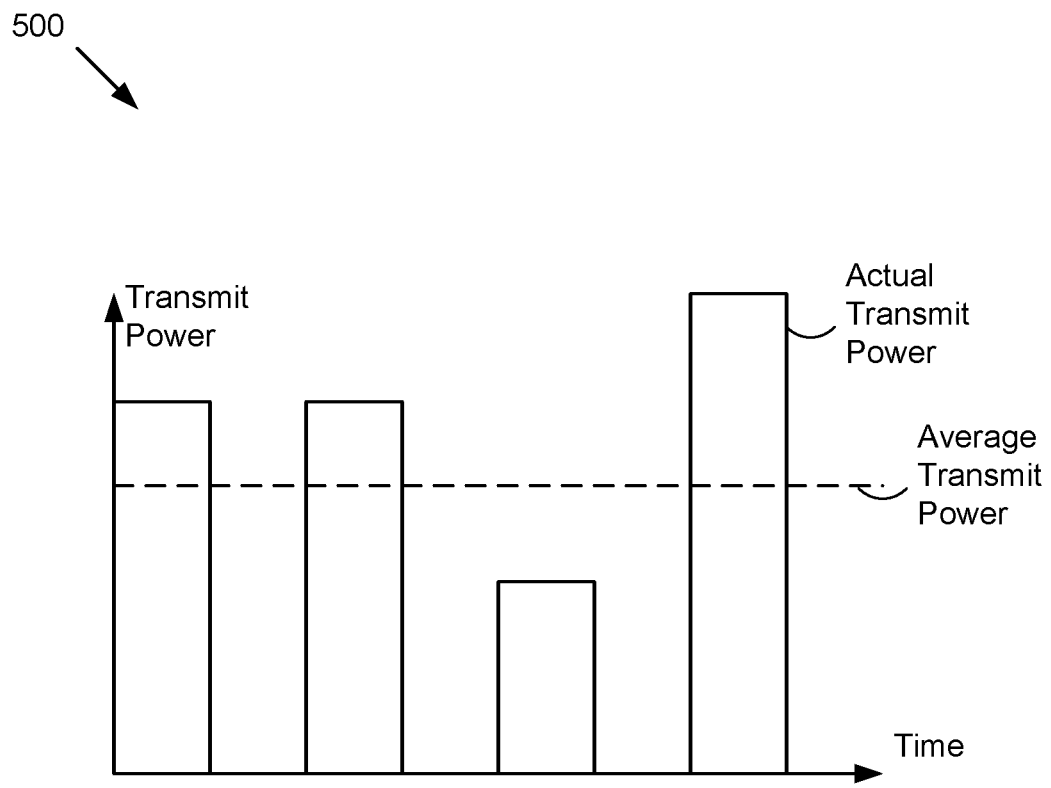
FIG. 5 illustrates additional transmit power levels for the wireless communication device in accordance with some embodiments.

FIG. 5 illustrates a graph 500 of transmit power levels for a set of "transmit on" time periods interspersed with a set of "transmit off" time periods for a wireless communication device 102. The average transmit power level for the wireless communication device 102 can be substantially lower using discontinuous transmission than a transmit power level required by using continuous "transmit on" time periods.

Figure 6:
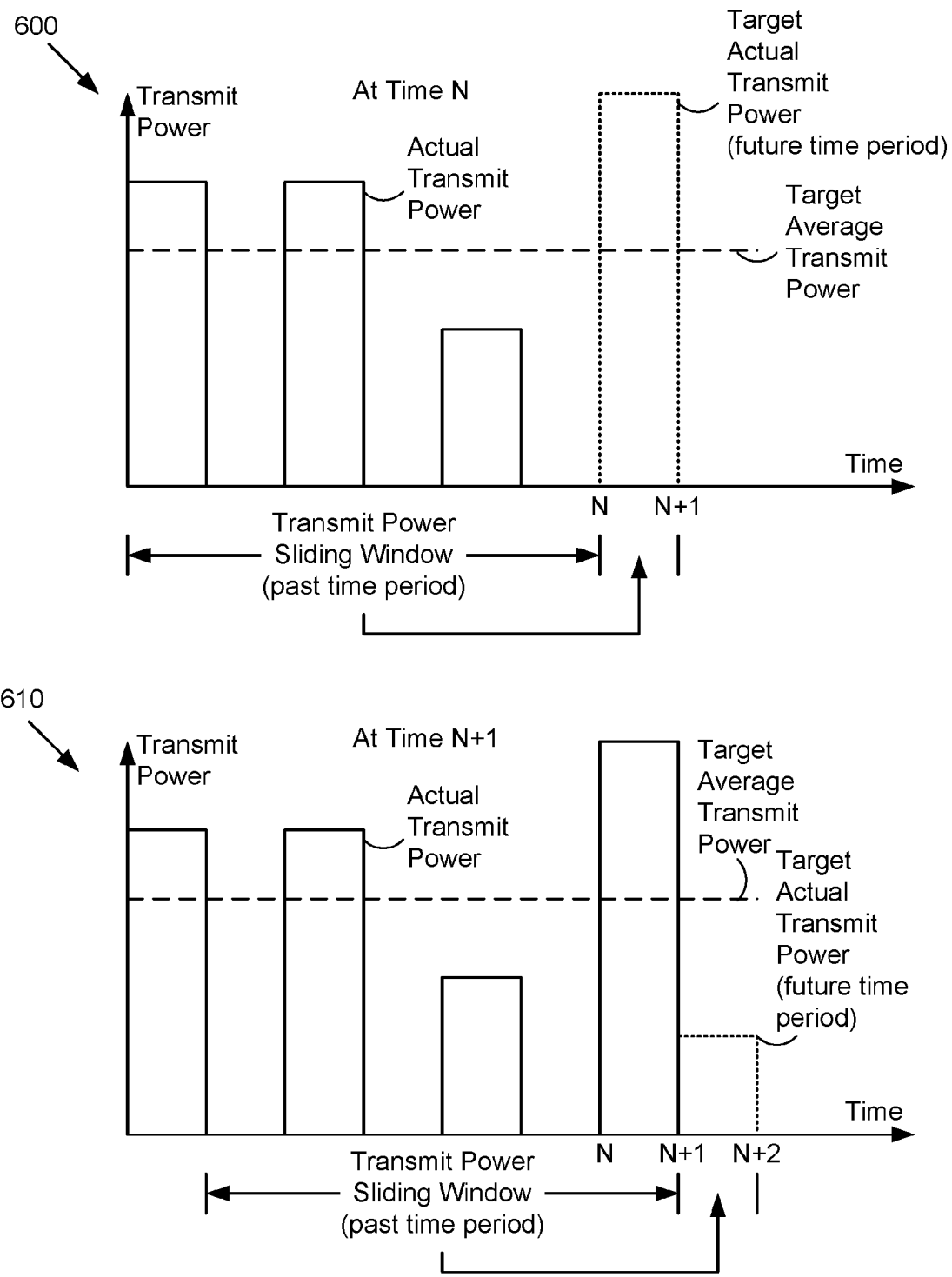
FIG. 6 illustrates a set of adaptive transmit power levels for the wireless communication device in accordance with some embodiments.

FIG. 6 illustrates graphs 600/610 of transmit power levels for a wireless communication device 102 in accordance with some embodiments. At a time "N", processing circuitry, e.g., the wireless processor 306 and/or the application processor 304, in the wireless communication device 102 can measure and/or estimate an average transmit power level for a recent past time period. The processing circuitry can obtain a target average transmit power level and can determine a target actual transmit power level in a future time period (e.g., occupying the time interval between time "N" and time "N+1") based at least in part on the average transmit power level of the recent past time period and the target average transmit power level as shown in graph 600. The processing circuitry of the wireless communication device 102 can repeat the process at time N+1 as shown in graph 610, e.g., by using a "sliding window" technique to measure and/or estimate an average transmit power level over a "new" recent past time period and to determine a new target actual transmit power level for a new future time period (e.g., occupying the time interval between the time "N+1" and time "N+2") based at least in part on the average transmit power level of the most recent past time period and the target average transmit power level. In an embodiment, the wireless processor 306 determines the target average transmit power level based on information provided from the application processor 304. In an embodiment, the application processor 304 provides the target average transmit power level to the wireless processor 306. In an embodiment, the application processor 304 includes a temperature simulation and/or prediction algorithm that indicates a target transmit power level or target transmit power consumption given a set of temperatures measured by various components in the wireless communication device 102.

Figure 7:
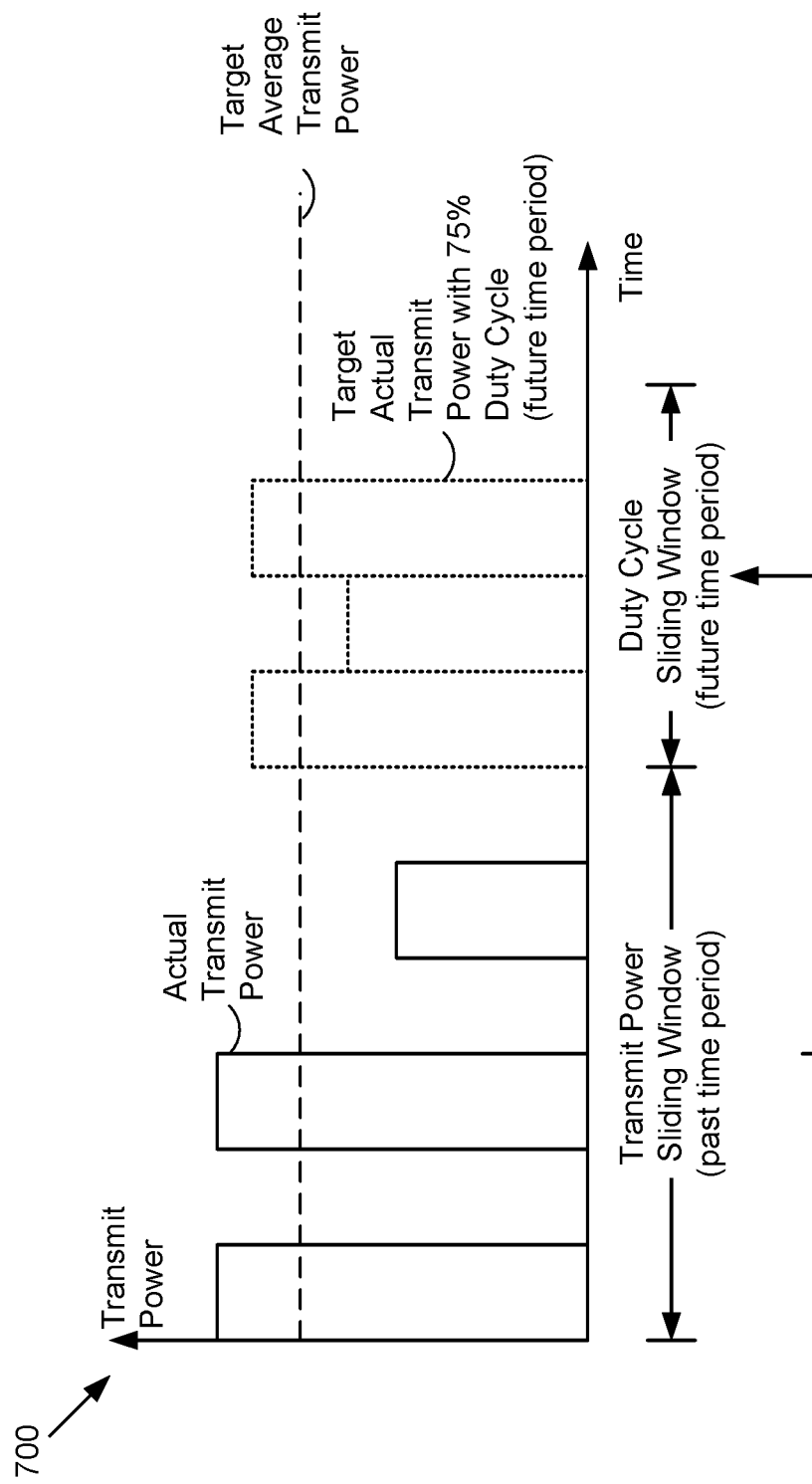
FIG. 7 illustrates another set of adaptive transmit power levels for the wireless communication device in accordance with some embodiments.

FIG. 7 illustrates a graph 700 of transmit power levels for a wireless communication device 102 in accordance with some embodiments. Processing circuitry, e.g., the wireless processor 306 and/or the application processor 304, in the wireless communication device 102 can measure and/or estimate an average transmit power level for a past time period (indicated by the transmit power sliding window). The processing circuitry of the wireless communication device 102 can obtain a target average transmit power level and can determine a target actual transmit power duty cycle for a future time period (e.g., indicated by the duty cycle sliding window). In an embodiment, the processing circuitry can determine both a target duty cycle and a target transmit power level for the future time period. As illustrated in FIG. 7, the target duty cycle and/or the target transmit power level in combination with the target duty cycle can be determined to achieve (or approximate) a target average transmit power level. In some embodiments, the processing circuitry determines a pattern of "transmit on" and "transmit off" time periods for the future time period that achieve (or approximate) the target duty cycle. In some embodiments, the processing circuitry of the wireless communication device 102 communicates a set of one or more signaling messages, e.g., buffer status reports, during the future time period to achieve (or approximate) the target duty cycle and/or the target average transmit power or both. In some embodiments, the wireless communication device 102 communicates to a NodeB 210 one or more buffer status reports including non-zero values (for pending uplink data) before and/or during "transmit on" time periods and one or more buffer status reports including zero values (for pending uplink data) before and/or during "transmit off" time periods. In some embodiments, the wireless communication device 102 indicates an actual amount of data pending in uplink transmit buffers in the buffer status reports that include non-zero values. In some embodiments, the wireless communication device 102 indicates a zero amount of data pending in uplink transmit buffers in the buffer status reports that include zero values, irrespective of an actual amount of data pending in the uplink transmit buffers of the wireless communication device 102.

Figure 8:
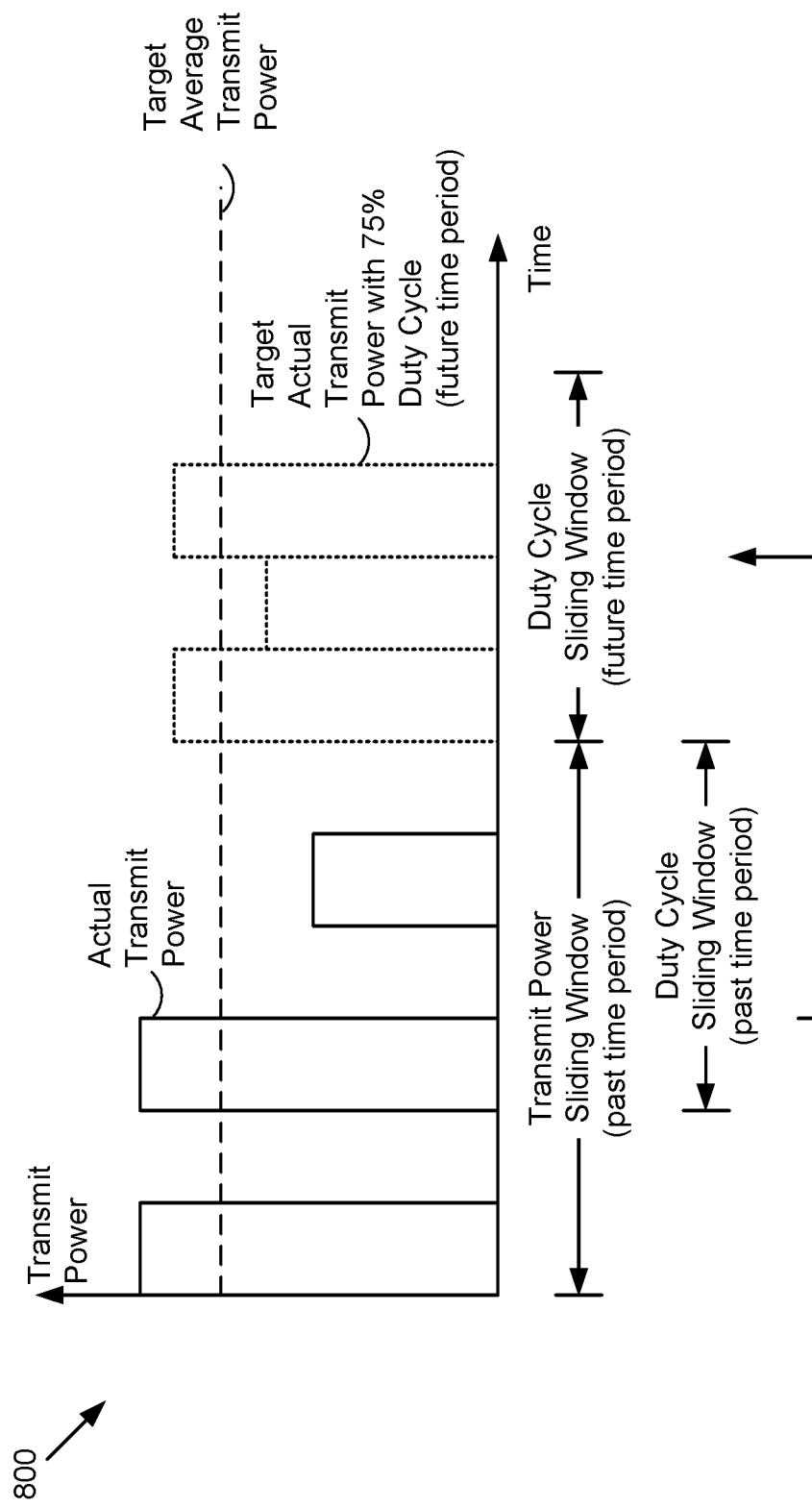
FIG. 8 illustrates a further set of adaptive transmit power levels for the wireless communication device in accordance with some embodiments.

FIG. 8 illustrates a graph 800 of transmit power levels for a wireless communication device 102 in accordance with some embodiments. Processing circuitry, e.g., the wireless processor 306 and/or the application processor 304, in the wireless communication device 102 can measure and/or estimate an average transmit power level for a past time period (indicated by the transmit power sliding window) and a duty cycle for a past time period (indicated by the duty cycle sliding window over the past time period). The processing circuitry can obtain a target average transmit power level and can determine a target actual transmit power duty cycle for a future time period (e.g., indicated by the duty cycle sliding window over the future time period). In an embodiment, the processing circuitry can determine both a target duty cycle and a target transmit power level for the future time period. As illustrated in FIG. 8, the target duty cycle and/or the target transmit power level in combination with the target duty cycle can be determined to achieve (or approximate) a target average transmit power level for the wireless communication device 102 during the future time period. In some embodiments, the processing circuitry determines a pattern of "transmit on" and "transmit off" time periods for the future time period that achieve (or approximate) the target duty cycle. In some embodiments, the processing circuitry of the wireless communication device 102 communicates one or more signaling messages, e.g., buffer status reports, during the future time period to achieve (or approximate) the target duty cycle and/or the target average transmit power or both. In some embodiments, the wireless communication device 102 communicates to a NodeB 210 one or more buffer status reports including non-zero values (for pending uplink data) before and/or during "transmit on" time periods and one or more buffer status reports including zero values (for pending uplink data) before and/or during "transmit off" time periods.

Figure 9:
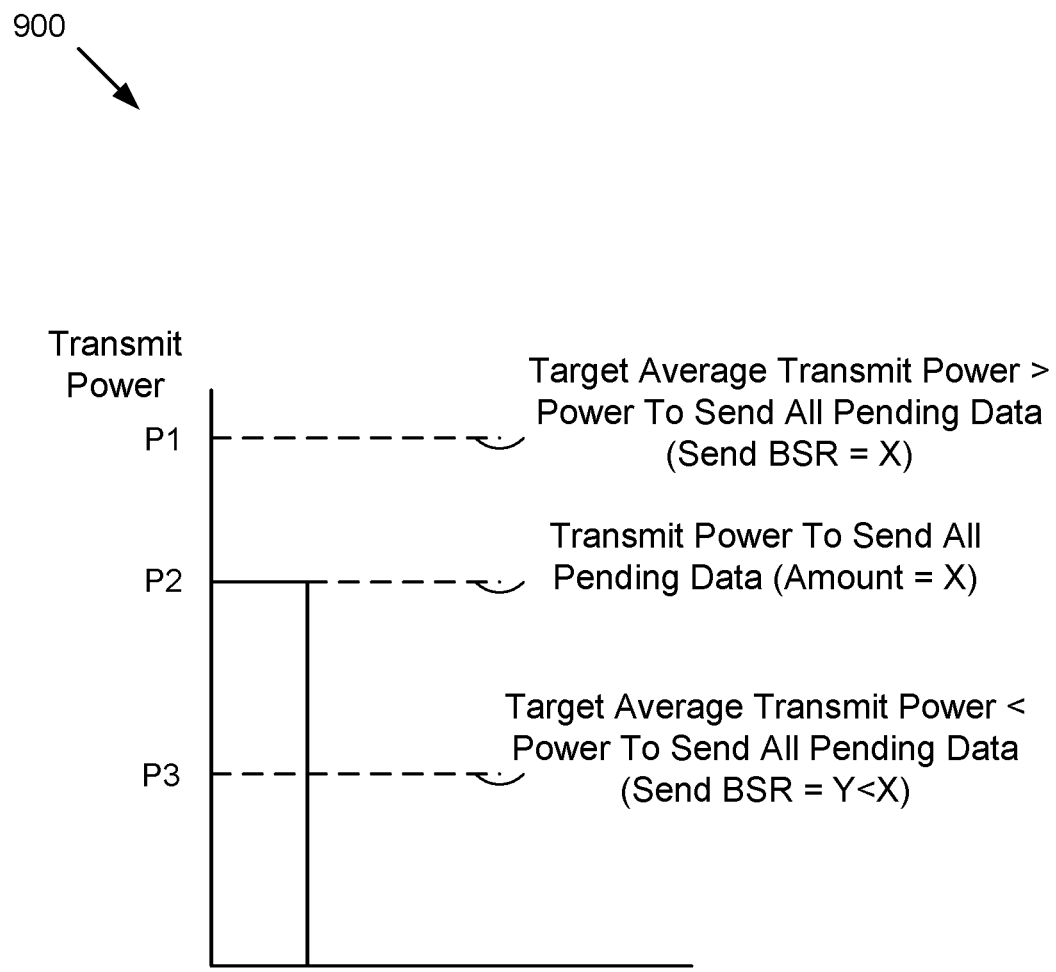
FIG. 9 illustrates a representative mapping between target transmit power levels and buffer status report values in accordance with some embodiments.

FIG. 9 illustrates a representative mapping 900 between target transmit power levels and buffer status report values in accordance with some embodiments. A transmit power level P2 can be associated with a transmit power level required to transmit an amount "X" of pending uplink data in one or more transmit buffers of the wireless communication device 102. The amount "X" can represent all of the pending uplink data in the one or more transmit buffers of the wireless communication device 102. The transmit power level P2 associated with transmitting all of the pending uplink data (i.e., to send the total amount "X" of pending uplink data) in a future time period can be higher or lower than a target average transmit power level determined by processing circuitry in the wireless communication device 102. When a target average transmit power level P1 exceeds the total transmit power level P2 for transmitting all of the pending uplink data in the one or more transmit buffers, the wireless communication device 102 can communicate a set of one or more signaling messages that indicate a pending uplink buffer data amount of "X", e.g., in one or more buffer status reports sent before and/or during one or more "transmit on" time periods. When a target average transmit power level P3 is less than the total transmit power level P2 for transmitting all of the pending uplink data in the one or more transmit buffers, the wireless communication device 102 can communicate one or more signaling messages that indicate a pending uplink transmit buffer data amount of "Y" (where Y<X), e.g., in one or more buffer status reports sent before and/or during one or more "transmit on" time periods. In some embodiments, the wireless communication device 102 can communicate less than the total amount of pending uplink data in the signaling messages to the eNodeB 210 in order to ensure that a target transmit power level is not exceeded.

Figure 10:
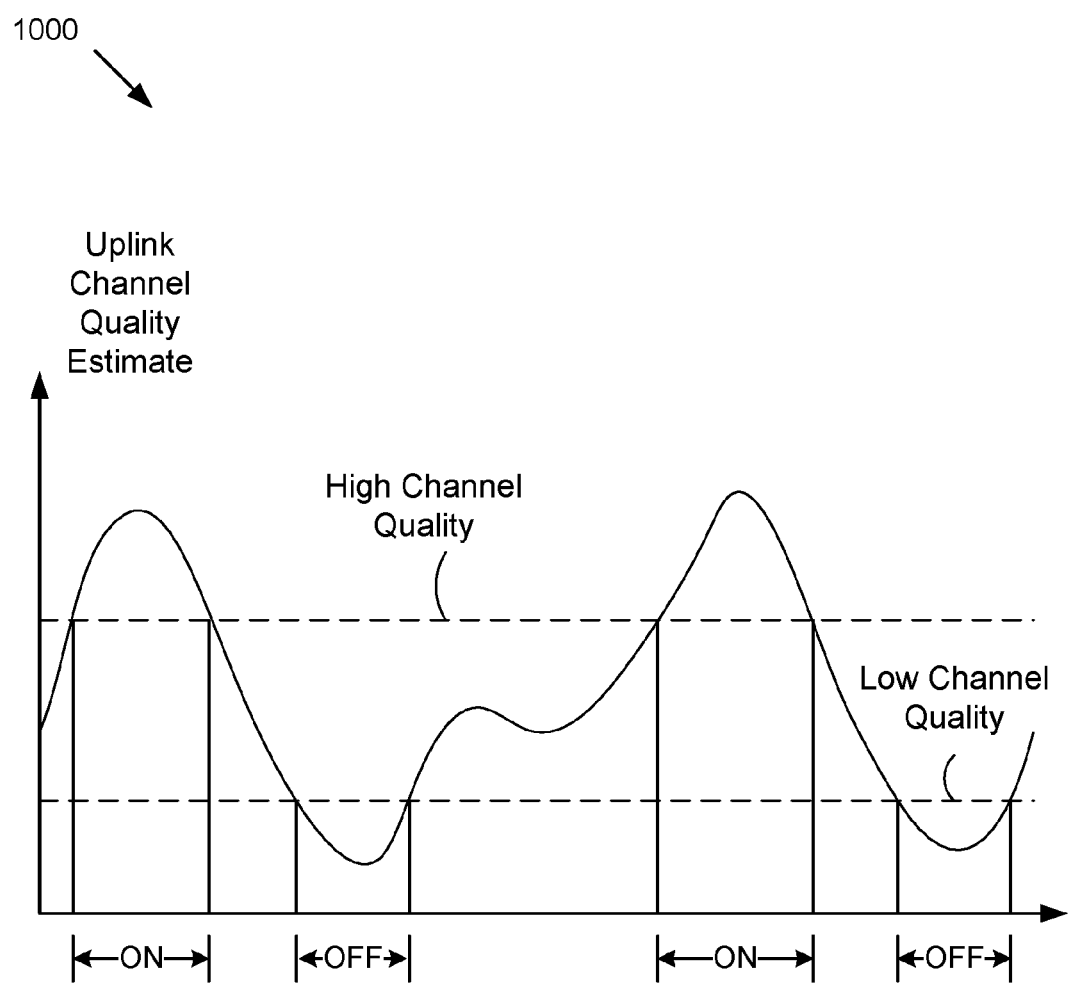
FIG. 10 illustrates a representative mapping between uplink channel quality estimates and transmit on/off periods in accordance with some embodiments.

FIG. 10 illustrates a representative mapping 1000 between uplink channel quality estimates and "transmit on" and "transmit off" time periods in accordance with some embodiments. The wireless communication device 102 can determine an estimate of uplink radio frequency channel conditions, e.g., using (1) information from a current and/or past set of channel quality indicators (CQIs) provided to the eNodeB 210, (2) a measure and/or estimate of downlink transmission path loss (attenuation), (3) a measure of uplink transmit power levels (e.g., indicated by the eNodeB 210), and/or (4) a history of uplink radio resource allocations provided to the wireless communication device 102 (e.g., relative to buffer status report values provided to the eNodeB 210). Processing circuitry in the wireless communication device 102 can predict channel quality conditions for a future time period, e.g., estimate SINR values. The wireless communication device 102 can set one or more channel quality levels that can be used to determine at least in part "transmit on" and "transmit off" time periods. In an embodiment, candidate (and/or actual) "transmit on" time periods can be selected based on a predicted uplink channel quality estimate above a high channel quality level, and candidate (and/or actual) "transmit off" time periods can be selected based on a predicted uplink channel quality estimate below a low channel quality level. In some embodiments, processing circuitry in the wireless communication device 102 can concentrate data transmissions during time periods in which estimated channel quality levels exceed the high channel quality level and can forgo (and/or limit) data transmissions during time periods in which estimated channel quality levels fall below the low channel quality level. In some embodiments, when an estimated channel quality level falls between the high channel quality level and the low channel quality level, the processing circuitry can select the time period as a "transmit on" or a "transmit off" time period, e.g., in order to satisfy a target average transmit power level and/or target duty cycle for the future time period.

Figure 11:
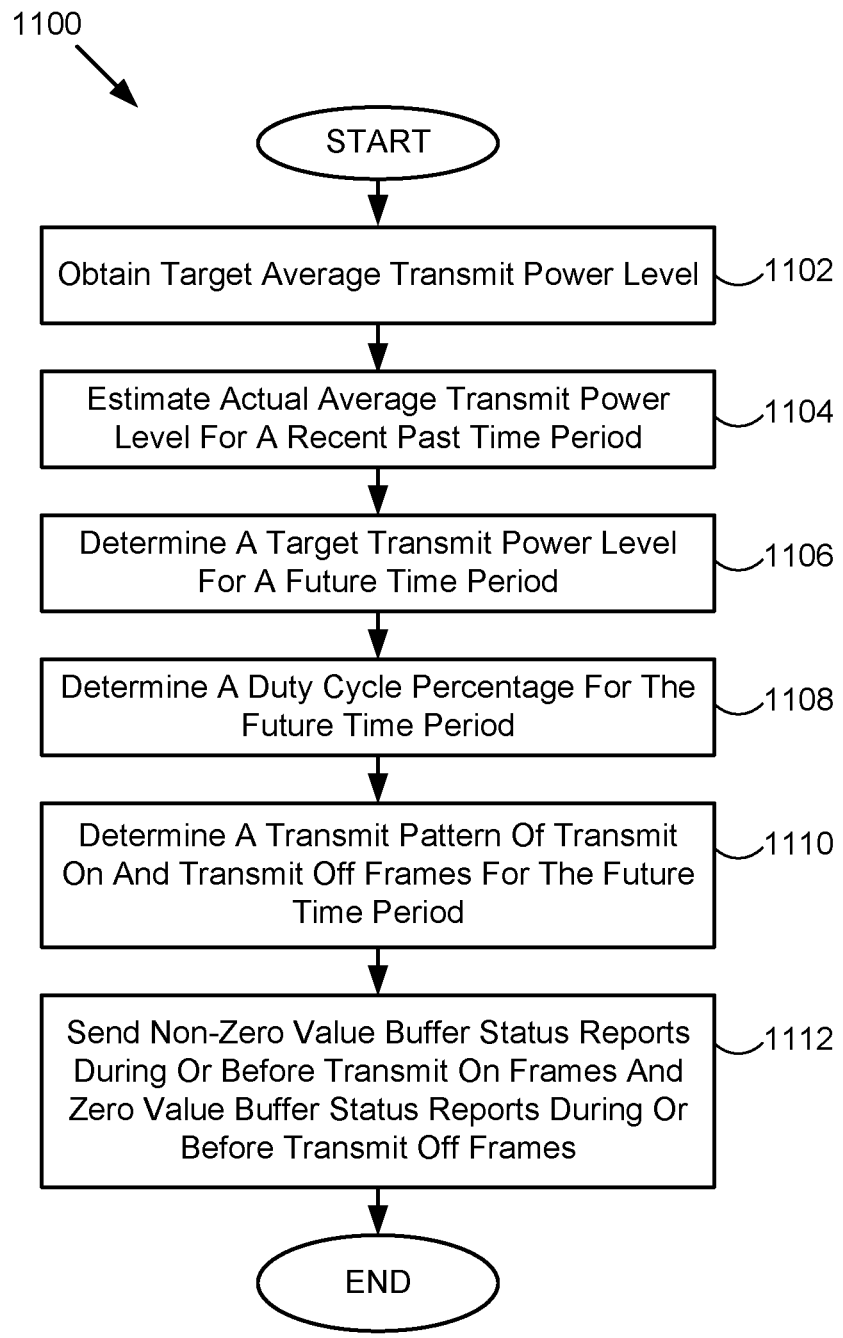
FIG. 11 illustrates a representative method for adapting transmission levels in a mobile wireless communication device in accordance with some embodiments.

FIG. 11 illustrates a representative method 1100 for adapting transmission levels in a mobile wireless communication device 102 in accordance with some embodiments. In step 1102, processing circuitry in the wireless communication device 102 obtains a target average transmit power level. In step 1104, the processing circuitry estimates an actual average transmit power level for a recent past time period. In step 1106, the processing circuitry determines a target average transmit power level for a future time period. In step 1108, the processing circuitry determines a target duty cycle percentage for the future time period, the target duty cycle percentage specifying a percentage of "transmit on" time and "transmit off" time for the future time period. In step 1110, the processing circuitry determines a transmit pattern of "transmit on" and "transmit off" frames for the future time period, the transmit pattern determined to achieve the target duty cycle percentage. In step 1112, the processing circuitry of the wireless communication device 102 sends one or more buffer status reports that include non-zero values before and/or during "transmit on" frames of the future time period and one or more buffer status reports that include zero values before and/or during "transmit off" frames of the future time period. In some embodiments, the processing circuitry of the wireless communication device 102 sends to an access network system of a wireless network to which the wireless communication device is connected one or more signaling messages indicating a non-zero amount of data associated with the transmit on frames and one or more signaling messages indicating a zero amount of data associated with the transmit off frames. In some embodiments, the processing circuitry obtains the target average transmit power at least in part by receiving one or more transmit power control commands from an applications processor in the wireless communication device 102 and calculating a target average transmit power based on the received transmit power control commands and a current transmit power level. In some embodiments, the processing circuitry obtains the target average transmit power at least in part by receiving a target average transmit power level and/or a target average transmit power consumption from the application processor of the wireless communication device 102. In some embodiments, the processing circuitry obtains the target average transmit power by receiving one or more temperature measurements from one or more thermal sensors on and/or adjacent to components of the wireless communication device 102 and calculates the target average transmit power to achieve a desired temperature level and/or transmit power consumption level for at least one of the components. In some embodiments, the processing circuitry of the wireless communication device 102 estimates the actual average transmit power for a recent past time period by calculating the average transmit power used during a sliding window over the recent past time period. In some embodiments, the processing circuitry of the wireless communication device 102 determines a target duty cycle for a future time period by calculating a maximum percentage of time of the future time period during which to enable one or more transmitters to meet and/or to not exceed a target average transmit power level and/or a target average transmit power consumption. In some embodiments, the processing circuitry determines the transmit pattern of "transmit on" frames and "transmit off" frames of the future time period based at least in part on selecting one or more frames with an estimated high uplink channel quality (e.g., a high SINR level) as candidate and/or actual "transmit on" frames and selecting one or more frames with an estimated low uplink channel quality (e.g., a low SINR level) as candidate and/or actual "transmit off" frames. In some embodiments, the processing circuitry communicates an actual amount of pending uplink data in transmit buffers in the buffer status reports with non-zero values and a zero amount of pending uplink data in the buffer status reports with zero values (the latter irrespective of the actual amount of pending uplink data in one or more transmit buffers of the wireless communication device 102.) In some embodiments, the processing circuitry aligns one or more "transmit on" time periods to correspond to (and/or overlap) time periods during which uplink signaling messages are communicated to (and/or scheduled to be communicated to) the eNodeB 210, e.g., during periodic channel status reports.

The processing circuitry of the wireless communication device 102 can indirectly control transmit power levels and therefore transmit power consumption by selecting values for signaling messages used by the eNodeB 210 to allocate uplink radio resources. Representative signaling messages include buffer status reports that provide an indication of an amount of uplink data pending in buffers of the wireless communication device 102. The processing circuitry can iteratively calculate an average transmit power level using a sliding window technique. The sliding window can span a number of frames over which uplink transmit power levels can be averaged, e.g., a time period of 100 milliseconds spanning 10 frames of 10 milliseconds each. For each average transmit power level calculated, the processing circuitry can determine for a number of future frames whether to transmit (and/or request radio resources for transmission) and a level at which to transmit (and/or an amount of data to request to transmit). The processing circuitry can also determine a duty cycle of transmission for the future frames (e.g., 50% "on" and 50% "off", or 30% "on" and 70% "off"), in which the wireless communication device 102 may transmit (and/or may request radio resources for transmission) during the "on" frames and may not transmit (and/or may request no radio resources for transmission) during the "off" frames.

In some embodiments, algorithms executed by processing circuitry in the wireless communication device 102 directly link target transmit power levels with transmit power duty cycles that specify a percentage of time (and/or frames) during which transmission may occur in a future time period. The processing circuitry can determine a distribution pattern of "transmit on" and "transmit off" frames (or more generally time periods) for the future time period to achieve the determined transmit duty cycle. The processing circuitry can send buffer status reports to an access network system, e.g., the eNodeB 210, that reflect an actual uplink transmit buffer status to associate with "transmit on" frames and zero-valued buffer status reports to associate with "transmit off" frames. In an embodiment, the processing circuitry requests uplink radio resources from the eNodeB 210 to maximize data transmissions during the "transmit on" frames and to minimize data transmissions during the "transmit off" frames. By sending a buffer status report with a value of zero, the processing circuitry can indicate to the eNodeB 210 to not allocate resources during the "transmit off" frames. In some embodiments, when the wireless communication device 102 receives a non-zero uplink radio resource allocation in response to a zero-valued buffer status report, the wireless communication device 102 communicates pending uplink data (when available) instead of sending padding data (unless no pending uplink data is available for transmission). The processing circuitry can determine a "transmit on" and "transmit off" distribution of frames in a future time period using at least in part one or more of: (1) a current transmit power level, (2) an estimate of uplink radio frequency channel conditions, (3) a transmit power allocation, (4) a maximum transmit power level indicated by the eNodeB 210, (5) uplink channel state information, (6) a past history of uplink radio resource allocations (e.g., modulation and coding schemes and/or primary radio bearer properties), (7) downlink channel attenuation estimates, (8) downlink signal strength measurements and/or estimates, (9) downlink channel quality measurements and/or estimates, and (10) a past history of transmit power levels. In some embodiments, the processing circuitry attempts to align "transmit on" frames with time periods having "high channel quality" estimates and to align "transmit off" frames with time periods having "poor channel quality" estimates. In some embodiments, the processing circuitry attempts to align "transmit on" frames with time periods assigned for periodic uplink signaling, e.g., regular channel status reports and/or other messages.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A processing circuitry apparatus configurable for operation in a wireless device, the processing circuitry apparatus comprising:

a processor, and a memory coupled to the processor, wherein the memory comprises instructions that, when executed by the processor, cause the processing circuitry apparatus to:

estimate an actual average transmit power level for a recent past time period by at least calculating an average transmit power level over a sliding window that includes the recent past time period;

determine a transmit pattern of transmit on frames and transmit off frames for a future time period based at least in part on a target average transmit power level for the future time period and the estimated actual average transmit power level for the recent past time period; and send to a wireless network a set of one or more signaling messages that indicate a non-zero amount of data for the transmit on frames and a zero amount of data for the transmit off frames.

2. The processing circuitry apparatus of claim 1, wherein the target average transmit power level is based on a target temperature level for one or more components of the wireless device.

3. The processing circuitry apparatus of claim 1, wherein the target average transmit power level is based on a target transmit power consumption level for one or more components of one or more transmitters of the wireless device.

4. The processing circuitry apparatus of claim 1, wherein:

the set of one or more signaling messages comprises one or more buffer status reports sent before or during corresponding transmit on frames or transmit off frames, the non-zero amount of data comprises an actual amount of pending uplink data of at least one transmit buffer of the wireless device, and the zero amount of data comprises a zero value irrespective of the actual amount of pending uplink data of the at least one transmit buffer of the wireless device.

5. The processing circuitry apparatus of claim 1, wherein the processing circuitry apparatus determines the transmit pattern of transmit on frames and transmit off frames by at least:

designating frames of the future time period having estimated high channel quality as transmit on frames, and designating frames of the future time period having estimated low channel quality as transmit off frames.

6. A wireless device comprising:

one or more transmitters coupled to at least one antenna;

one or more processors; and memory coupled to the one or more processors, wherein the memory stores instructions that, when executed by the one or more processors, cause the wireless device to:

estimate an actual average transmit power level for a recent past time period by at least calculating an average transmit power level over a sliding window that includes the recent past time period;

determine a transmit pattern of transmit on frames and transmit off frames for a future time period based at least in part on a target average transmit power level for the future time period and the estimated actual average transmit power level for the recent past time period; and send to a wireless network a set of one or more signaling messages that indicate a non-zero amount of data for the transmit on frames and a zero amount of data for the transmit off frames.

7. The wireless device of claim 6, wherein the target average transmit power level is based on a target temperature level for one or more components of the wireless device.

8. The wireless device of claim 6, wherein the target average transmit power level is based on a target transmit power consumption level for one or more components of the one or more transmitters of the wireless device.

9. The wireless device of claim 6, wherein:
the set of one or more signaling messages comprises one or more buffer status reports sent before or during corresponding transmit on frames or transmit off frames,
the non-zero amount of data comprises an actual amount of pending uplink data of at least one transmit buffer of the wireless device, and
the zero amount of data comprises a zero value irrespective of the actual amount of pending uplink data of the at least one transmit buffer of the wireless device.

10. The wireless device of claim 6, wherein the wireless device determines the transmit pattern of transmit on frames and transmit off frames by at least:
designating frames of the future time period having estimated high channel quality as transmit on frames, and
designating frames of the future time period having estimated low channel quality as transmit off frames.

11. A processing circuitry apparatus configurable for operation in a wireless device, the processing circuitry apparatus comprising:
a processor, and
a memory coupled to the processor,
wherein the memory comprises instructions that, when executed by the processor, cause the processing circuitry apparatus to:
estimate an actual average transmit power level for a recent past time period by at least calculating an average transmit power level over a sliding window that includes the recent past time period;
determine a duty cycle percentage for a future time period based at least in part on a target average transmit power level for the future time period and the estimated actual average transmit power level for the recent past time period; and
send to a wireless network a set of one or more signaling messages that indicate a non-zero amount of data for transmit on frames and a zero amount of data for transmit off frames in accordance with the duty cycle percentage for the future time period.

12. The processing circuitry apparatus of claim 11, wherein the target average transmit power level is based on a target temperature level for one or more components of the wireless device.

13. The processing circuitry apparatus of claim 11, wherein the target average transmit power level is based on a target transmit power consumption level for one or more components of one or more transmitters of the wireless device.

14. The processing circuitry apparatus of claim 11, wherein:
the set of one or more signaling messages comprises one or more buffer status reports sent before or during corresponding transmit on frames or transmit off frames,
the non-zero amount of data comprises an actual amount of pending uplink data of at least one transmit buffer of the wireless device, and
the zero amount of data comprises a zero value irrespective of the actual amount of pending uplink data of the at least one transmit buffer of the wireless device.

15. The processing circuitry apparatus of claim 11, wherein the processing circuitry apparatus determines the duty cycle percentage for the future time period by at least calculating a maximum percentage of time of the future time period during which to enable one or more transmitters of the wireless device to not exceed the target average transmit power level.

16. A wireless device comprising:
one or more transmitters coupled to at least one antenna;
one or more processors; and
memory coupled to the one or more processors,
wherein the memory stores instructions that, when executed by the one or more processors, cause the wireless device to:
estimate an actual average transmit power level for a recent past time period by at least calculating an average transmit power level over a sliding window that includes the recent past time period;
determine a duty cycle percentage for a future time period based at least in part on a target average transmit power level for the future time period and the estimated actual average transmit power level for the recent past time period; and
send to a wireless network a set of one or more signaling messages that indicate a non-zero amount of data for transmit on frames and a zero amount of data for transmit off frames in accordance with the duty cycle percentage for the future time period.

17. The wireless device of claim 16, wherein the target average transmit power level is based on a target temperature level for one or more components of the wireless device.

18. The wireless device of claim 16, wherein the target average transmit power level is based on a target transmit power consumption level for one or more components of the one or more transmitters of the wireless device.

19. The wireless device of claim 16, wherein:
the set of one or more signaling messages comprises one or more buffer status reports sent before or during corresponding transmit on frames or transmit off frames,
the non-zero amount of data comprises an actual amount of pending uplink data of at least one transmit buffer of the wireless device, and
the zero amount of data comprises a zero value irrespective of the actual amount of pending uplink data of the at least one transmit buffer of the wireless device.

20. The wireless device of claim 16, wherein the wireless device determines the duty cycle percentage for the future time period by at least calculating a maximum percentage of time of the future time period during which to enable the one or more transmitters of the wireless device to not exceed the target average transmit power level.

* * * * *